United States Patent
Wang et al.

(10) Patent No.: US 11,398,359 B2
(45) Date of Patent: Jul. 26, 2022

(54) TRANSPARENT KEYCAPS

(71) Applicant: Apple Inc., Cupertino, CA (US)

(72) Inventors: Paul X. Wang, Cupertino, CA (US); Christopher D. Jones, Los Gatos, CA (US); Dinesh C. Mathew, San Francisco, CA (US); Keith J. Hendren, San Francisco, CA (US); Martin Melcher, Mountain View, CA (US); Matthew S. Rogers, San Jose, CA (US); Naoto Matsuyuki, Kasugai (JP); Simon R. Lancaster-Larocque, San Jose, CA (US); Avianne Marie B. Tuano, New Castle, DE (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/408,209

(22) Filed: May 9, 2019

(65) Prior Publication Data
US 2020/0211795 A1    Jul. 2, 2020

Related U.S. Application Data

(60) Provisional application No. 62/784,955, filed on Dec. 26, 2018.

(51) Int. Cl.
| H01H 13/83 | (2006.01) |
| H01H 13/14 | (2006.01) |
| H01H 13/84 | (2006.01) |

(52) U.S. Cl.
CPC ............ *H01H 13/14* (2013.01); *H01H 13/83* (2013.01); *H01H 13/84* (2013.01); *H01H 2219/03* (2013.01); *H01H 2219/06* (2013.01)

(58) Field of Classification Search
CPC ...... H01H 13/83; H01H 13/84; H01H 13/023; H01H 2219/03
See application file for complete search history.

(56) References Cited

U.S. PATENT DOCUMENTS 5,515,763 A * 5/1996 Vandervoort ............ G10C 3/12
                                                        400/483
6,322,875 B1   11/2001 Kimura
(Continued)

FOREIGN PATENT DOCUMENTS

| CN | 200953302 Y | 9/2007 |
| CN | 202120794 U | 1/2012 |
| CN | 204102769 U | 1/2015 |
| CN | 107706028 A | 2/2018 |
| JP | 2002108538 A | 4/2002 |
| JP | 2004311049 A | 11/2004 |

(Continued)

OTHER PUBLICATIONS

PCT International Search Report for International Application No. PCT/US2019/037276, dated Oct. 2, 2019 (4 pp.).

*Primary Examiner* — Felix O Figueroa
(74) *Attorney, Agent, or Firm* — Dorsey & Whitney LLP

(57) ABSTRACT

Keycaps for keyboards that have transparent top portions have a set of layered components to define a top surface that provides key definition by curvature, texture, ridges, or other external structural features. Other portions of the keycaps define a glyph or support structure for the top layer. Features such as angle filters and partially reflective materials are implemented to improve the visibility, contrast, and reflectivity of the keycaps. Multiple methods are used to bend or otherwise modify rigid transparent materials such as glass in order to add surface features and to improve aesthetics of the keycaps of a keyboard.

9 Claims, 9 Drawing Sheets

(56) References Cited

U.S. PATENT DOCUMENTS

| | | | |
|---|---|---|---|
| 8,134,094 B2 | 3/2012 | Tsao et al. | |
| 8,854,312 B2 * | 10/2014 | Meierling | H01H 13/83 345/170 |
| 9,704,670 B2 * | 7/2017 | Leong | H01H 13/83 |
| 9,710,069 B2 * | 7/2017 | Leong | H01H 13/83 |
| 10,493,847 B2 * | 12/2019 | Yoshida | H01H 13/83 |
| 10,496,164 B2 * | 12/2019 | Johnson | G02F 1/0045 |
| 10,579,157 B1 * | 3/2020 | Wilson | H01H 13/83 |
| 10,984,970 B2 * | 4/2021 | Huang | H01H 13/83 |
| 2010/0163389 A1 | 7/2010 | Tsao et al. | |
| 2011/0298716 A1 | 12/2011 | Mahowald et al. | |
| 2012/0145522 A1 | 6/2012 | Lee | |
| 2015/0090571 A1 | 4/2015 | Leong et al. | |
| 2018/0294113 A1 * | 10/2018 | Mahajan | H01H 13/702 |
| 2018/0323021 A1 | 11/2018 | Lai et al. | |

FOREIGN PATENT DOCUMENTS

| | | |
|---|---|---|
| JP | 2007242302 A | 9/2007 |
| JP | 2008065597 A | 3/2008 |
| JP | 2009021108 A | 1/2009 |
| JP | 3167165 U | 4/2011 |
| JP | 2011070322 A | 4/2011 |
| JP | 2012079473 A | 4/2012 |
| JP | 2013503324 A | 1/2013 |
| JP | 2015069644 A | 4/2015 |
| JP | 2015185281 A | 10/2015 |
| JP | 2015215993 A | 12/2015 |
| JP | 2017001902 A | 1/2017 |
| JP | 2018512363 A | 5/2018 |
| JP | 2018528909 A | 10/2018 |
| TW | 201608588 A | 3/2016 |

* cited by examiner

TRANSPARENT KEYCAPS

CROSS-REFERENCE TO RELATED APPLICATION(S)

This application claims priority to U.S. Provisional Patent Application No. 62/784,955, filed 26 Dec. 2018, and entitled "TRANSPARENT KEYCAPS," the entire disclosure of which is hereby incorporated by reference.

FIELD

The described embodiments relate generally to keycaps for computing keyboards that are at least partially transparent or translucent.

BACKGROUND

Many electronic devices have interface devices and mechanisms to receive input and interaction from users. Major fields for device interaction include computers, such as personal computers, tablet computers, smartphones, and other "smart" devices, such as media players, video and audio equipment, vehicle consoles, home automation controllers, and related devices. These devices can include keyboards, keypads, buttons, touchpads, and other input devices to receive user input. In some cases, the input devices can also provide output and feedback to users as well, such as through visual, touch/haptics, or audio indicators.

A pleasing exterior appearance of an electronic device is often difficult to pair with the market demand for advanced functionality, improved durability, key definition, and reduced thickness and weight. Some aesthetically pleasing materials may not be sufficiently durable to include in a device housing or other components, and other aesthetically pleasing materials can interfere with the advanced functionality of the electronic device. Some aesthetic materials are brittle, rigid, or difficult to manufacture into keycaps with desired surface features.

Further, for certain input devices and components such as buttons and keys, a user can physically engage the selected material several hundreds of thousands of times, if not millions of times, over the life of a device. Many visually pleasing solutions lack the durability for such extended function. This can be especially true when electronic devices and/or associated input devices are made smaller, thinner, or otherwise reduced in dimension. Reduced dimensions of keycaps, for example, can lead to keycaps that are less structurally sound and have a shorter lifetime than thicker keycaps made of the same material.

Accordingly, device makers and users have a need for constant improvements to buttons and keys used in input devices.

SUMMARY

One aspect of the present disclosure relates to a keycap for a keyboard that includes a key body comprising a top external surface. The key body can comprise a transparent body having a bottom surface, a light-blocking material attached to the bottom surface of the transparent body, with the light-blocking material defining a glyph shape, and a carrier body configured to support the transparent body and the light-blocking material. The top external surface can include at least two edges and a center, with the at least two edges being raised relative to the center.

In some cases, the transparent body can comprise a glass material, the carrier body can comprise a polymer material, and the light-blocking material can comprise an opaque layer positioned between the glass material and the polymer material. The transparent body can comprise a transparent polymer material, and the top external surface can also comprise concave curvature. That concave curvature can be substantially cylindrically or spherically concave.

In some embodiments, the top external surface can comprise at least two ridged portions along the at least two edges. The top external surface can comprise a first texture at the center and a second texture radially external to the center, wherein the second texture can be different from the first texture.

Another aspect of the disclosure relates to a method of manufacturing a curved keycap. The method can include forming a curved top surface on a piece of glass material and attaching the piece of glass material to a non-glass carrier body with the curved top surface exposed. Forming the curved top surface can comprise adding a transparent material in a curved shape on an edge of a substantially flat top surface of the piece of glass material.

Forming the curved top surface can comprise inducing a bend in the piece of glass material. The bent material can be constrained to limit unbending of the piece of glass material. In another example, internal stresses of the bent material can be relieved after inducing the bend. In some embodiments, inducing the bend can comprise chemically strengthening a portion of the piece of glass material.

Methods of forming the curved top surface can comprise applying the piece of glass material to a mold, slumping the piece of glass material, or removing material from a substantially flat top surface of the piece of glass material. The non-glass carrier body can comprise a substantially flat top surface and the piece of glass material can be attached to the substantially flat top surface of the non-glass carrier body. In some embodiments, the method can further include positioning an at least semi-opaque material between the piece of glass material and the non-glass carrier body.

Yet another aspect of the disclosure relates to a keyboard for a computing device, wherein the keyboard includes a base layer, a set of keycaps, and a set of support mechanisms. The keycaps can include a transparent material comprising a bottom surface, a partially mirrored material positioned under the bottom surface of the transparent material; and a carrier body configured to support the transparent body and the partially mirrored material. The set of support mechanisms can be coupled to the set of keycaps to stabilize actuation movements of the set of keycaps relative to the base layer.

Each keycap can further include an opaque material positioned under the bottom surface of the transparent material, with the opaque material having a glyph aperture and the partially mirrored material covering the glyph aperture. Light from a light source below the carrier backing can be configured to pass through the carrier backing, the partially mirrored material, and the transparent material. The keycap can further include an angle filter. In some cases, the partially mirrored material can comprise an angle filter. The transparent material can comprise a top surface having edges and a center, with the edges being raised relative to the center.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
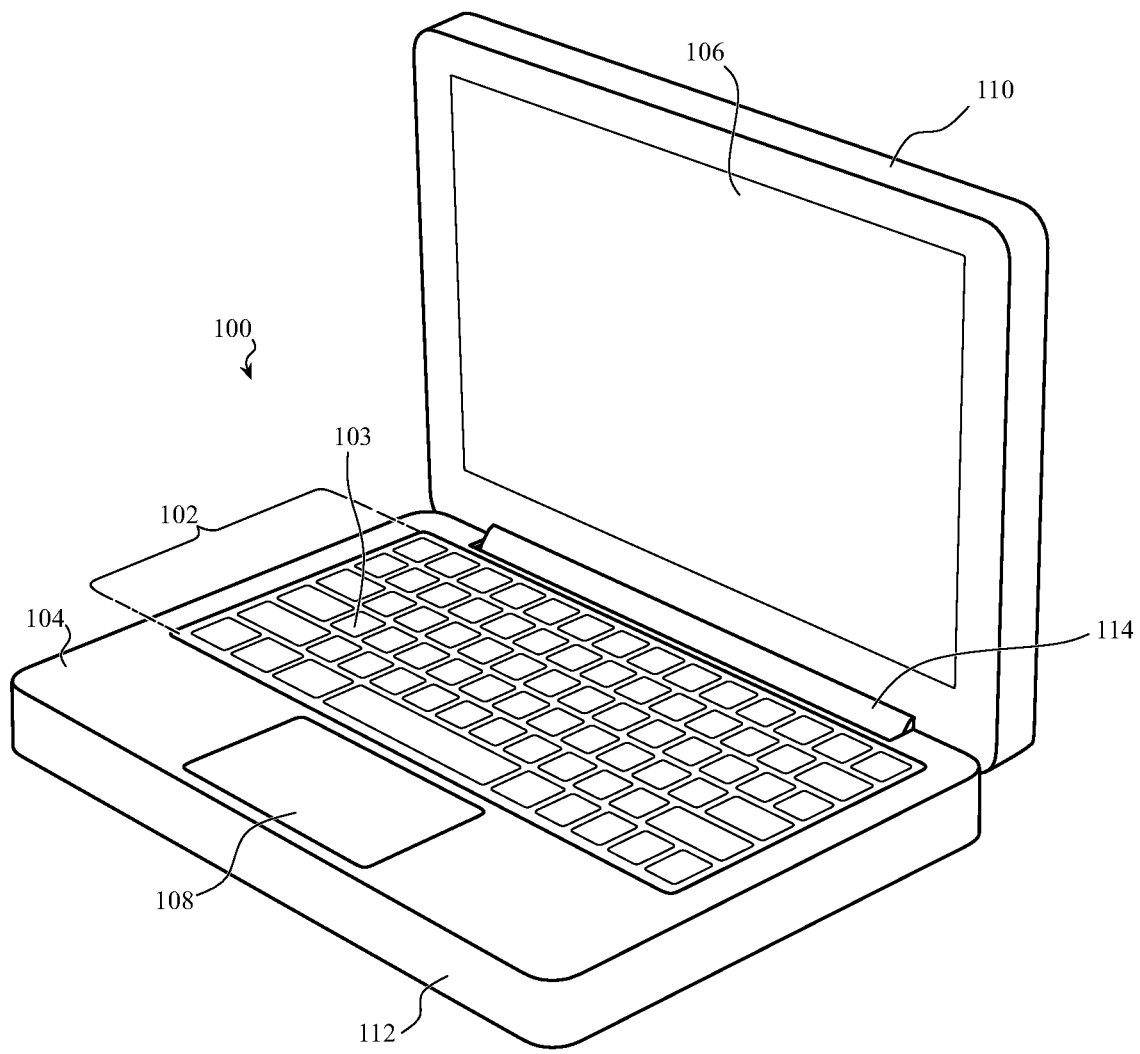
FIG. 1 shows an isometric view of an electronic device according to an aspect of the present disclosure.

Aspects of the present disclosure relate to keycaps for keyboards, buttons, and other input devices. These keyboards can benefit from being thin, light, and durable. Glasses, transparent ceramics (e.g., sapphire), transparent polymers, and similar materials can be desirable to use on a surface of keycaps to achieve these objectives. When used as typing surfaces or other touch interfaces, these materials can be durable and difficult to blemish or scratch, even when subjected to millions of use cycles. They can be made thin while still having high rigidity and stiffness, so keycaps with these materials can be made thin while still being resistant to bending and flexing when pressed. Their transparency or translucency can also be advantageous in keyboards with keys that are backlit or side-lit since they can transfer, reflect, or distribute light. Their surfaces can be smoothed and polished and can resist scratching or other blemishes.

Aspects of the present disclosure relate to implementing these materials in keycaps while preserving or enhancing their surface characteristics related to providing key definition (i.e., key registration). For example, some aspects of the disclosure relate to key structures that assist the user in positioning (e.g., "homing") a finger or other instrument on a desired surface of a keycap. These structures can help the user feel an edge or other portion of the keycap without having to look at the keys, thereby improving typing speed, accuracy, and comfort. The structures can also provide a sleek visual appearance, improved visibility of backlit characters or glyphs positioned in the keys, and improved visibility of the edges of adjacent keys or the spaces between them.

In various aspects of the disclosure, the key structures incorporated in keycaps include surface curvature, raised edges, ridges, varying textures, and other features that are visible or that can be contacted while the user is typing or otherwise using the keys. The keycaps can include multiple layers or components, wherein a top layer comprises an at least partially transparent material that incorporates at least one of the key structures. For instance, the top surface of the top layer can include at least two edges and a center, with the at least two edges being raised relative to the center when the keycap is in a substantially horizontal orientation (i.e., the at least two edges extend to a height greater than a substantially centrally located area on the top surface of the keycap). A middle layer can comprise a light-blocking material attached to a bottom surface of the top layer and defining glyph section. A lower layer or carrier body can comprise a durable material configured to connect to a keycap stabilizer, collapsible dome, or other keycap support structure. In various embodiments, the layers of the keycap can serve different functions and can comprise different materials.

Coatings or reflective layers can also be incorporated into the keycaps to improve visibility, contrast, color variation, or other appearance characteristics of the keycaps. For example, keycaps can incorporate filters that block light based on viewing angles or that reflect at least a portion of light around the keyboard or the illumination under the keys.

Aspects of the present disclosure also relate to methods used to manufacture transparent keycaps. Glass and related materials can be brittle when thin and are generally delicate when subjected to bending moments, but embodiments of the present disclosure can provide a curved or ridged surface to glass and related materials. In some embodiments, the glass is flexed into a curved shape and then attached to a separate part in a manner that limits or prevents the glass from returning to a flat shape. In other cases, the glass can be insert molded, press formed, gob-formed, chemically strengthened, added to, ground, cut, turned, or slumped, as described in greater detail elsewhere herein.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

FIG. 1 depicts an electronic device 100 including a keyboard 102. The keyboard 102 includes key mechanisms or assemblies with keycaps (e.g., keycap 103) or button caps that move when depressed by a user. The device 100 can position the keyboard 102 within a housing 104 that also contains a display 106 (e.g., a liquid crystal display (LCD) screen) and a track pad 108. The housing 104 can comprise an upper housing 110 supporting the display 106 and a base housing 112 supporting the keyboard 102 and track pad 108. The upper and base housings 110, 112 can be joined at a hinge 114, also known as clutch 114, about which the upper housing 110 can rotate relative to the base housing 112. The upper housing 110 can be referred to as a lid portion or upper portion, and the base housing 112 can be referred to as a base portion or lower portion.

Although the electronic device 100 of FIG. 1 is shown as a notebook/laptop computer, it will be readily apparent that features and aspects of the present disclosure that are described in connection with the notebook computer can be applied in various other devices. These other devices can include, but are not limited to, personal computers (including, for example, computer "towers," "all-in-one" computers, computer workstations, and related devices) and related accessories, speakers, graphics tablets and graphical input pens/styluses, watches, headsets, other wearable devices, and related accessories, vehicles and related accessories, network equipment, servers, screens, displays, and monitors, photography and videography equipment and related accessories, printers, scanners, media player devices and related accessories, remotes, headphones, earphones, device chargers, computer mice, trackballs, and touchpads, point-of-sale equipment, cases, mounts, and stands for electronic devices, controllers for games, remote control (RC) vehicles/drones, augmented reality (AR) devices, virtual reality (VR) devices, home automation equipment, and any other electronic device that uses, sends, or receives human input. Thus, the present disclosure provides illustrative and non-limiting examples of the kinds of devices that can implement and apply aspects of the present disclosure.

Figure 2:
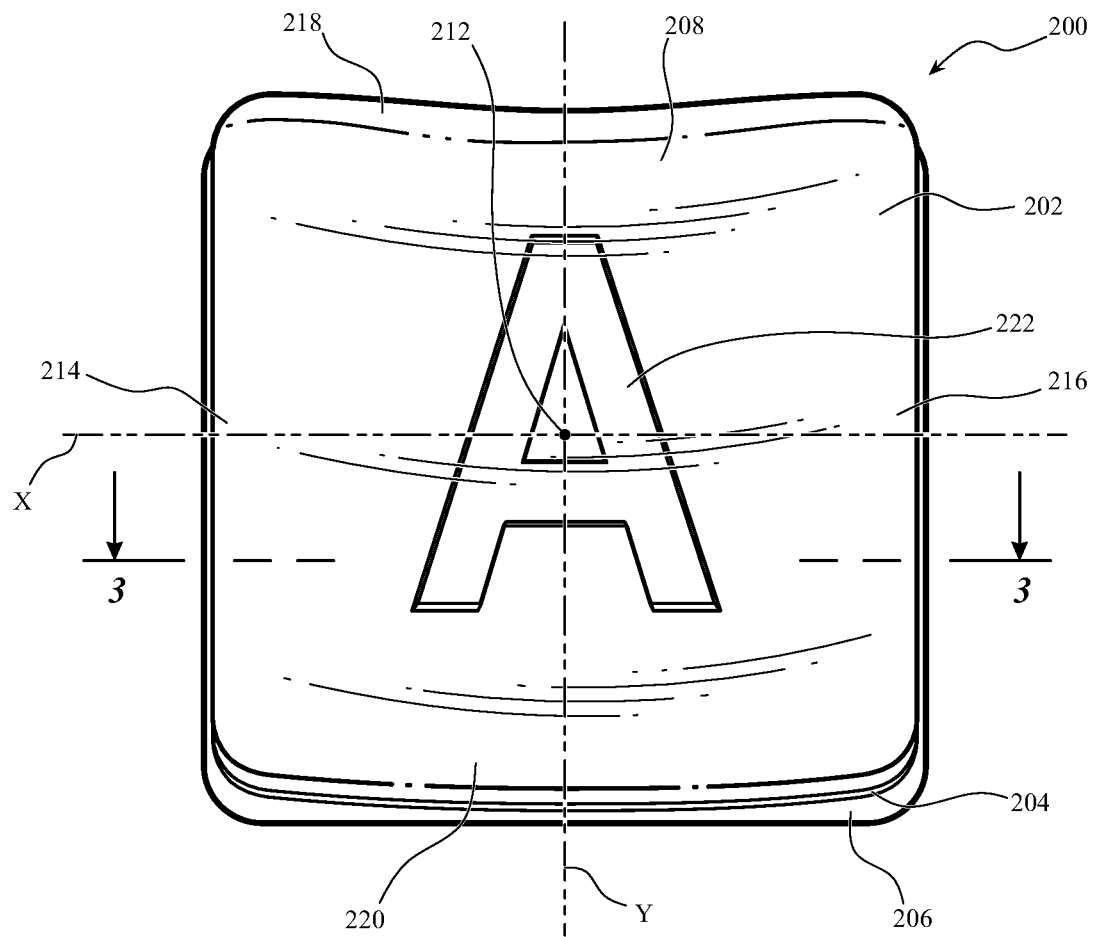
FIG. 2 shows an isometric view of a keycap according to an embodiment of the present disclosure.
Figure 3:
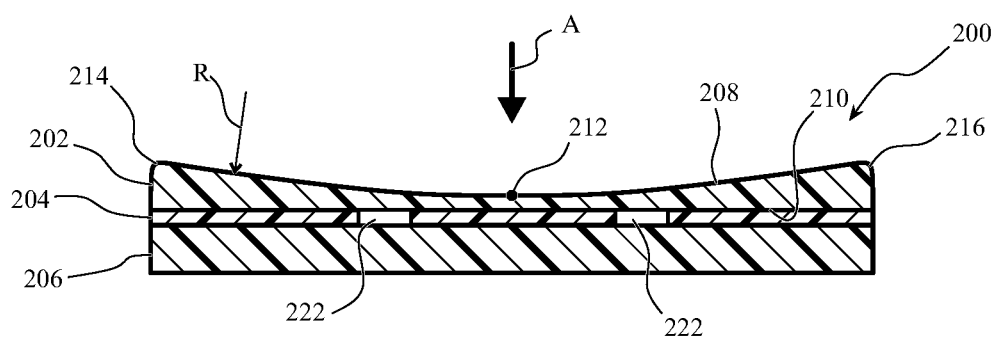
FIG. 3 shows a section view of the keycap of FIG. 2 taken through section lines 3-3 in FIG. 2.

FIG. 2 illustrates an isometric view of an example keycap 200 that can be used in a keyboard such as keyboard 102. For example, keycap 200 can be used in place of a keycap 103 of FIG. 1. FIG. 3 shows a side section view of the keycap 200 taken through section lines 3-3 in FIG. 2. The keycap 200 can comprise a transparent body 202, a middle layer 204, and a carrier body 206.

The transparent body 202 can be referred to as a top layer, outer layer, or user contact layer. The transparent body 202 can comprise a transparent or translucent material such as glass, float glass, toughened or tempered glass, frosted glass, mirrored glass, laminated glass, coated glass, transparent or translucent ceramics, transparent or translucent polymers (e.g., polycarbonate), similar materials, or combinations thereof. As used herein, a "transparent" body is defined as a body that is at least partially transmissive of visible light through its thickness. Thus, a "transparent" body can be completely transparent or completely clear (e.g., having a prism- or glass-like appearance), or it can be at least partially translucent (e.g., having a frosted or foggy appearance). In some embodiments, a transparent body can have a thickness of about 0.50 millimeters.

The transparent body 202 can also be configured to be exposed to the user when positioned in a keyboard assembly. This can be beneficial since the materials used in the transparent body 202 can be selected to withstand millions of use cycles (e.g., finger taps) with minimal or no change in color, bending, or fading. The materials used in the transparent body 202 can also be durable and can thereby limit or prevent scratches or chipping of the keycap 200. Additionally, because the transparent body 202 covers a glyph of the keycap, the glyph is protected from wear or fading. When glass is used in transparent body 202, the keycap is much stiffer than most plastic materials.

Thus, the transparent body 202 can be configured to transfer, diffuse, or redirect light through its surfaces. Ambient light that comes from generally above the keycap 200 (e.g., from direction A in FIG. 3) can pass through the top surface 208 of the transparent body 202 and can reflect from the middle layer 204 or can be diffused in multiple directions through the transparent body 202 (e.g., in a direction at least partially to a left or right side relative to direction A). Similarly, light entering the transparent body 202 from below the bottom surface 210 of the transparent body 202 can be diffused or can pass through the top surface 208 to be visible from above the keycap 200 (e.g., when viewing the keycap from direction A).

The top surface 208 can be smooth and can have a concave curvature. For example, the top surface 208 can have a radius R wherein a center point 212 of the top surface 208 can be positioned lower than at least two outer raised edges 214, 216 of the top surface 208. It is noted that while center points (e.g., center point 212) are generally depicted with a dot in the associated drawings, the illustration of a dot does not require that a physical feature (e.g., a bump, protrusion, or other structural irregularity) be formed in the top surface of the keycap. Rather, the top surface 208 (and other top surfaces) can include a smooth and continuous surface through the center point 212.

The top surface 208 can have a continuous radius R between the center point 212 and the at least two outer raised edges 214, 216. Thus, the top surface 208 can have a gentle scoop shape that guides a user's finger toward the center of the keycap 200 when the user presses down at a non-vertical angle or when the user presses down at a surface between the center point 212 and the at least two outer raised edges 214, 216. The concave shape of the top surface 208 can therefore help improve typing comfort and efficiency.

As shown in FIGS. 2 and 3, the top surface 208 can have a substantially cylindrical scooped curvature. In other words, the top surface 208 can lack curvature in a direction parallel to a central Y-axis (see FIG. 2) while curving along a direction perpendicular to the Y-axis (e.g., parallel to the X-direction in FIG. 2). The top surface 208 can therefore be referred to as having a "Y-cylindrical" concavity, curvature, or scoop shape since the cylindrical shape extends along the Y-axis. In some embodiments, this means the cylindrical axis of the curvature of the keycap is a line of symmetry of the top surface that divides the keycap into lateral sides. The line of symmetry can be a line of left/right horizontal symmetry of a glyph or legend area shown in the keycap 200. Substantially the entire length of the raised edges 214, 216 can be raised relative to the center point 212, and portions of the other edges 218, 220 of the top surface 208 (see FIG. 2) can have the same height or thickness in the transparent body 202 as the center point 212.

In some embodiments, the concavity of the top surface 208 can be oriented rotated 90-degrees from the view shown in FIG. 2, wherein there is substantially no curvature along a direction parallel to the X-axis, but there is curvature along a direction parallel to the Y-axis. In other words, the top and bottom edges 218, 220 can be substantially entirely raised relative to the center point 212, and the side edges 214, 216 can be at least partially at the same height or thickness in the transparent body 202 as the center point 212. In that case, the top surface 208 can be referred to as having "X-cylindrical" concavity, curvature, or scoop shape. The axis of the cylindrical curvature can be a line of symmetry of the keycap that divides the face of the keycap into front and back parts or that is a line of vertical symmetry of a glyph or legend area shown in the keycap.

Each type of curvature can affect the feel, appearance, and key definition of the keycap 200. For instance, a top surface 208 with Y-cylindrical concavity can provide more significant key definition between left-and-right laterally adjacent keycaps (e.g., keycaps that are next to each other along a direction parallel to the X-axis). A top surface with X-cylindrical concavity can provide more significant key definition between front-and-back laterally adjacent keycaps (e.g., keycaps that are next to each other along a direction parallel to the Y-axis). The improved key definition can be provided in each case because raised edges on each of the adjacent keycaps are located next to each other, and a user can easily feel a peak where the keycaps are next to each other relative to two adjacent flat surfaces.

FIGS. 2 and 3 show raised edges 214, 216 that extend along the entire length of the top surface 208 that extends in a direction parallel with the Y-axis. In other embodiments, the raised edges 214, 216 extend along only a portion of the entire length of the top surface 208 in a direction parallel to the Y-axis (or X-axis, in the case of an X-cylindrical curvature). In some embodiments, a series of bumps or other spaced apart raised portions extend along the length of the edge of the top surface 208. Furthermore, the edges 214, 216 can be ridges located closer to the center point 212 (as measured along the X-axis). Thus, the edges 214, 216 can be at the outermost limits of the width of the top surface 208, as shown in FIGS. 2 and 3, but they can be located spaced inward relative to those outermost limits. Thus, the device maker can optimize the amount of space between the edges 214, 216 of adjacent keycaps or can optimize a radius of curvature of the top of the edges 214, 216 to be smoother or sharper relative to the view shown in FIG. 3.

The middle layer 204 of the keycap 200 can be positioned between the transparent body 202 and the carrier body 206. The middle layer 204 can be referred to as a light-blocking layer may include a light-blocking material in at least a portion thereof. As shown in FIGS. 2 and 3, the middle layer 204 can comprise a glyph 222. The glyph 222 can be referred to as a legend, symbol, character, or similar feature. The glyph 222 can be formed as an opening or aperture through the middle layer 204. Thus, the middle layer 204 can comprise an opaque material that has a glyph window or aperture through the opaque material that defines a glyph shape. For example, the opaque material can be an ink, paint, resin, or similar thin and opaque material applied to the transparent body 202 or the carrier body 206. Backlight illumination can pass through the glyph 222 to improve visibility of the glyph 222, especially in low-light conditions. Thus, the glyph 222 can be less opaque or lighter in appearance than the rest of the middle layer 204, at least when they are illuminated. The glyph 222 can comprise one or more words or symbols to indicate the purpose or function of the keycap 200. A "glyph area" or "legend area" in the middle layer 204 can include multiple letters or symbols, and the boundaries of a glyph area or legend area are defined by the outermost limits of the visible symbols or characters along the X- and Y-axes.

In some embodiments, the glyph 222 is located under a nadir of the curved top surface 208. In cases where a glyph aperture is formed in the middle layer 204, the aperture can be filled with a transparent or translucent material. For example, the aperture can be filled with a protrusion extending from the bottom surface 210 of the transparent body 202 or extending from a top surface of the carrier body 206. A glyph aperture can alternatively be configured to be empty and unfilled.

In some configurations, the middle layer 204 comprises a transparent material. The glyph 222 can then include an opaque (or more opaque) material. In this manner, the middle layer 204 can have a glyph 222 that appears darker than surrounding parts of the middle layer 204. See FIGS. 10-11 and their related descriptions herein.

The carrier body 206 or bottom layer can comprise a plastic or similar durable, moldable material that is attached to (e.g., bonded or overmolded to) the transparent body 202 and middle layer 204. The carrier body 206 can have a bottom surface or side surface with clips, hooks, links, or similar mechanical parts (not shown) configured to connect the keycap 200 to a stabilizer, collapsible dome, spring, or other support (not shown) for the keycap 200. It can be beneficial to include the carrier body 206 since plastic and similar materials are easier to mold into small and delicate shapes while remaining durable and not being subject to cracking or breaking. Thus, the carrier body 206 can be a durable substrate onto which a smoother, shinier, and durable transparent body 202 is attached. The carrier body 206 can also permit the keycap 200 to have smaller or more complicated bottom or side surface geometries that would be susceptible to breaking if they were made with the same material as the transparent body 202. Additionally, the carrier body 206 can be molded onto the transparent body 202 or middle layer 204 under conditions that would not melt or otherwise lead to deformation of those other layers 202, 204.

In some embodiments, the carrier body 206 comprises a translucent material and can act as a light distributor, diffuser, or guide within the keycap 200. Thus, light entering the carrier body 206 can be directed through desired portions of the middle layer 204 (e.g., through a glyph aperture) or laterally around the perimeter of the carrier body 206. In some embodiments, the carrier body 206 can be opaque and can comprise a channel or window for directing light through the bottom of the carrier body 206 to one or more desired portions of the middle layer 204.

Figure 4:
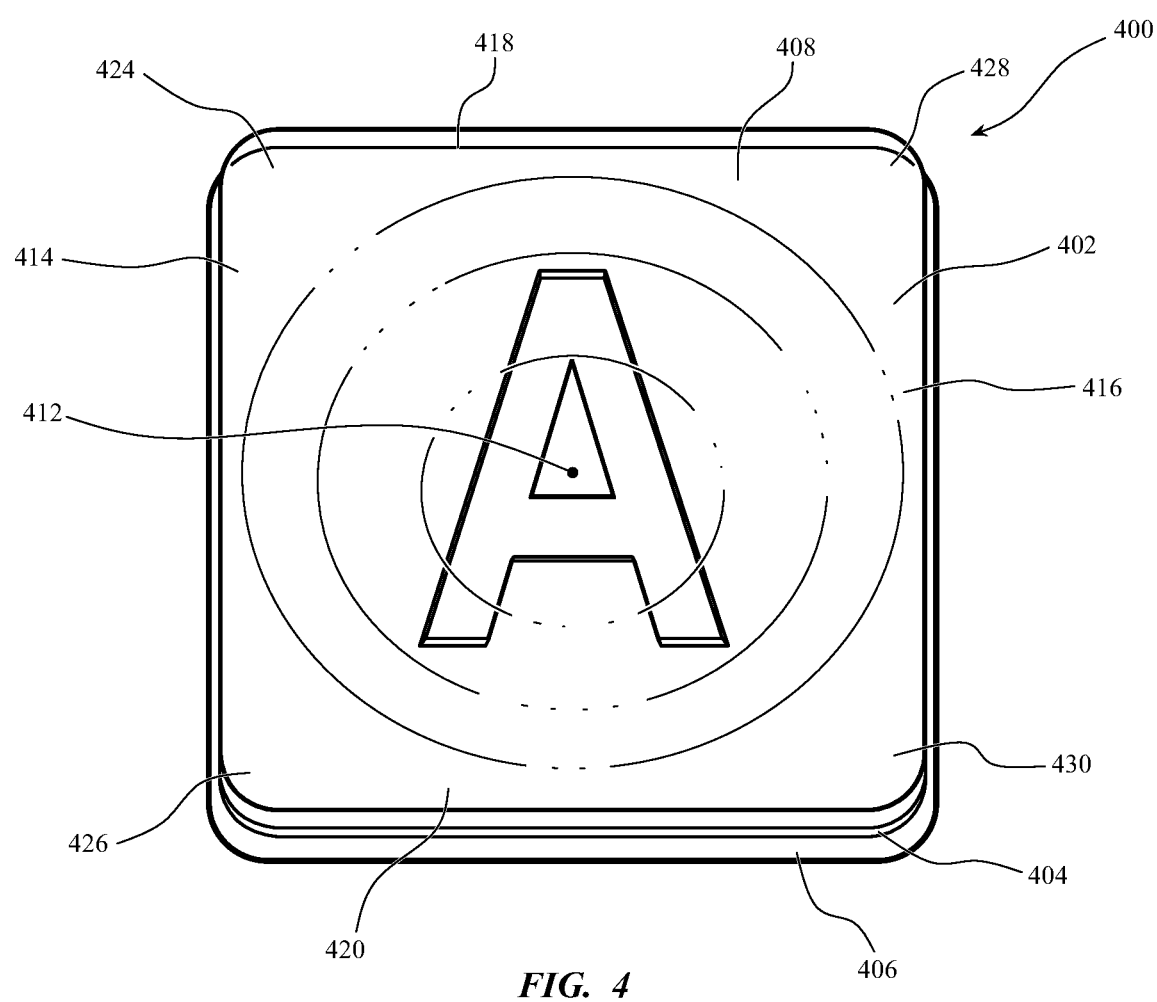
FIG. 4 shows an isometric view of a keycap according to another embodiment of the present disclosure.

FIG. 4 shows an isometric view of an alternative embodiment of a keycap 400 similar to keycap 200 of FIG. 2. In this embodiment, similar features are indicated using corresponding numeric indicators. The top surface 408 of the transparent body 402 of this keycap 400 can have a spherically dished concave curvature. Accordingly, the keycap 400 can be thinnest at the center point 412 of the top surface 408, and the keycap 400 can have increased thickness in all directions extending radially away from the center point 412 or extending perpendicularly away from a vertical axis extending through the center point 412. The transparent body 402 can have an equal thickness at its outer four corners 424, 426, 428, 430. Its outer edges 414, 416, 418, 420 can also have equal thicknesses. The middle layer 404 and carrier body 406 of keycap 400 can comprise features described above in connection with middle layer 204 and carrier body 206 of keycap 200. A spherical concave curvature of the top surface 408 can help the user seat a finger or other instrument more centered on the keycap 400 and can provide improved key definition in multiple directions (e.g., parallel to both the X- and Y-axes). In some embodiments, the curvature is elliptically concave, wherein the concavity of the top surface is deeper along one axis of the keycap relative to another.

Figure 5:
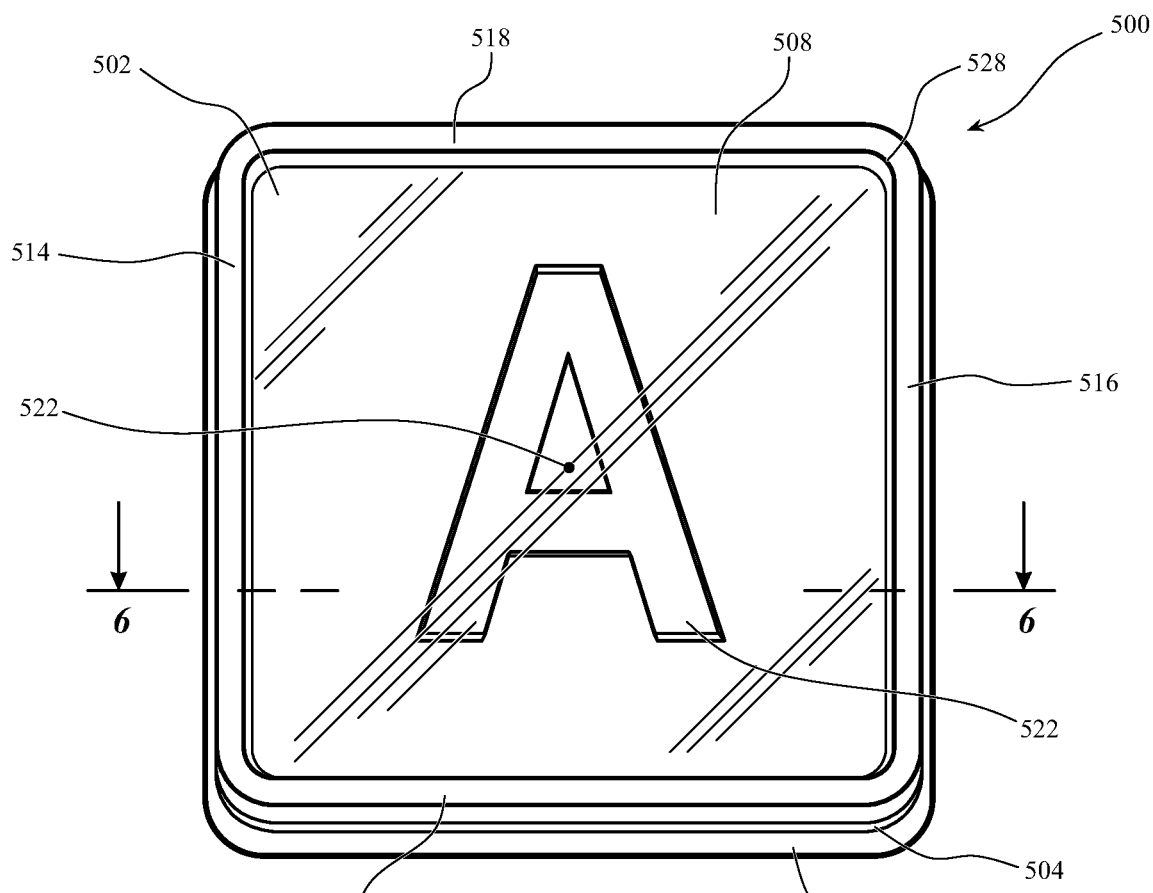
FIG. 5 shows an isometric view of a keycap according to another embodiment of the present disclosure.
Figure 6:
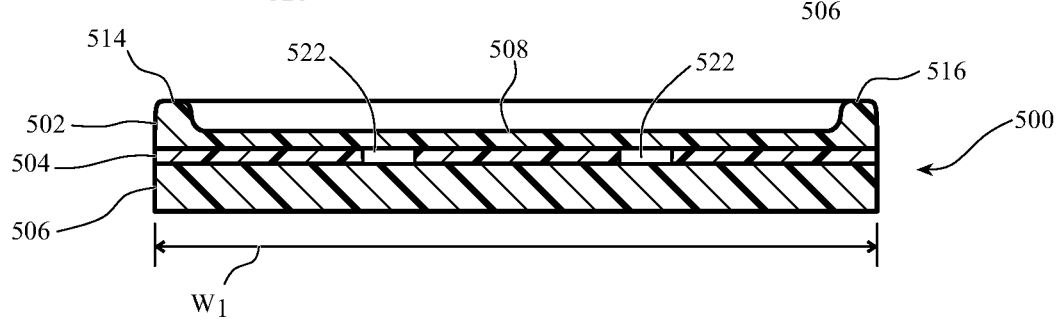
FIG. 6 shows a section view of the keycap of FIG. 5 taken through section lines 6-6 in FIG. 5.

FIG. 5 shows an isometric view of another embodiment of a keycap 500 similar to keycaps 200 and 400. FIG. 6 is a side section view of keycap 500 taken through section lines 6-6 in FIG. 5. Keycap 500 can comprise a transparent body 502 having a substantially flat central top surface 508 that is recessed relative to its edges 514, 516, 518, 520. Accordingly, the transparent body 502 can be referred to as being substantially planar with ridges or raised sections around its peripheral edges 514, 516, 518, 520. The edge ridges can have various heights, such as, for example, a rise relative to an adjacent surrounding surface between about 0.1 millimeters and about 0.2 millimeters or between about 0.15 millimeters and about 0.18 millimeters.

The ridges or raised sections can be rounded (e.g., radiused) or beveled (e.g., chamfered) around their top edges. The ridges or raised sections can improve key definition around all four edges 514, 516, 518, 520, particularly when they are positioned adjacent to raised edges of a neighboring keycap. A flat top surface 508 can be beneficial since it can have minimal refraction or other distortion of the shape of the glyph 522. The size, shape, and positioning of the ridges of the edges 514, 516, 518, 520 can be optimized to provide a desired amount of key definition for the keycap 500. The middle layer 504 and carrier body 506 of the keycap 500 can comprise features described above in connection with middle layer 204 and carrier body 206 of keycap 200.

As shown in FIG. 6, the transparent body 502 can be a top layer mounted to the middle layer 504 and carrier body 506 or bottom layer. Thus, all three components 502, 504, 506 can have an equal width $W_1$. That width $W_1$ can be equal to the overall width of the keycap 500. Thus, the entire top surface of the keycap 500 can be formed by the transparent body 502.

Figure 7:
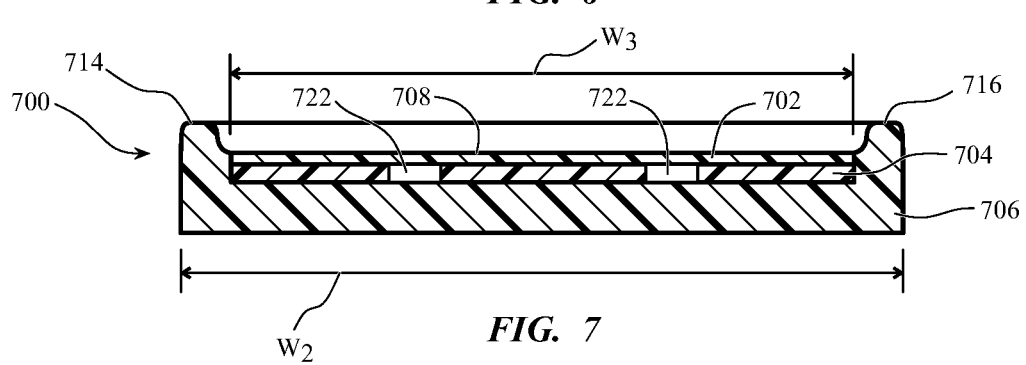
FIG. 7 shows a section view of an alternate embodiment of the keycap of FIG. 5.

FIG. 7 shows a side cross-section view of a related embodiment of a keycap 700 wherein the layers 702, 704, 706 do not all have equal lateral widths. The carrier body 706 can have a width $W_2$ that is greater than the widths $W_3$ of the transparent body 702 and middle layer 704. The raised edges 714, 716 of the keycap 700 can be part of the carrier body 706. Therefore, the carrier body 706 can extend upward beyond the top surface 708 of the transparent body 702. The top surface of the keycap 700 can be formed by a combination of the transparent body 702 and the carrier body 706. The carrier body 706 can have a vertical thickness that overlaps the thicknesses of the transparent body 702 and the middle layer 704. Thus, key definition features (e.g., 714, 716) can be formed as part of the carrier body 706. The keycap 700 can be manufactured by inserting the transparent body 702 and the middle layer 704 into the carrier body 706. In some embodiments, the carrier body 706 can be overmolded or insert molded around the transparent body 702 and the middle layer 704.

Figure 8:
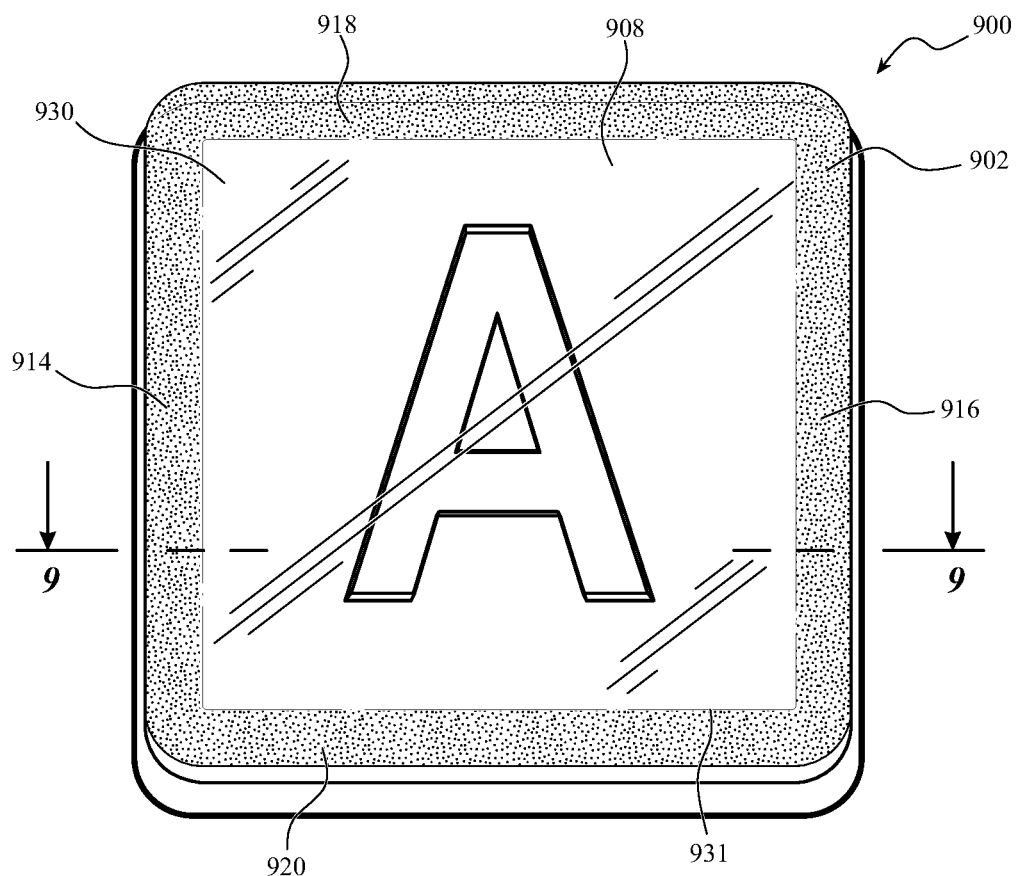
FIG. 8 shows an isometric view of a keycap according to another embodiment of the present disclosure.
Figure 9:
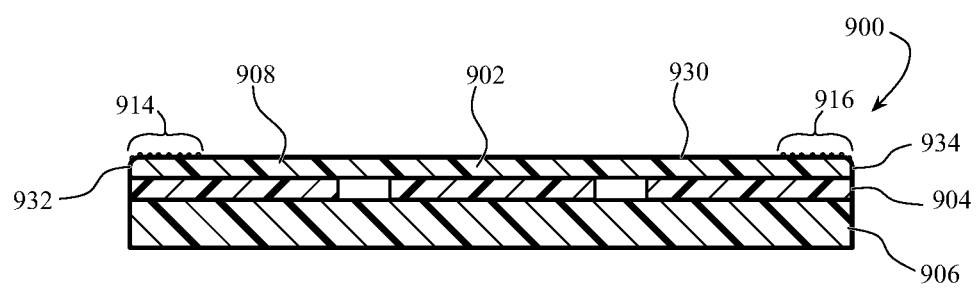
FIG. 9 shows a section view of the keycap of FIG. 8 taken through section lines 9-9 in FIG. 8.

FIG. 8 shows an isometric view of another embodiment of a keycap 900. FIG. 9 shows a side section view of the keycap 900 as taken through section lines 9-9 in FIG. 8. In this case, key definition is improved by incorporating different surface textures on the top surface 908 of the transparent body 902. For example, the outer edge areas 914, 916, 918, 920 of the top surface 908 can comprise a different (e.g., rougher or smoother) texture than a central area 930 of the top surface 908. Otherwise, the top surface 908 can be generally flat and planar. The middle layer 904 and carrier body 906 of keycap 900 can comprise features described above in connection with middle layer 204 and carrier body 206 of keycap 200. Thus, the keycap 900 can be very thin.

In various embodiments, the outer edge areas 914, 916, 918, 920 can be sanded, sandblasted, bead blasted, etched, or otherwise roughened in texture relative to the central area 930. Similarly, the top surface 908 can be manufactured with a roughened texture that is polished, glossed, resin domed, or otherwise smoothed over in the central area 930. In some arrangements, the central area 930 can be roughened in texture relative to the outer edge areas 914, 916, 918, 920. Additionally, although there is a border 931 distinctly defining the limits between the central area 930 and the outer edge areas 914, 916, 918, 920 in FIG. 8, in some cases, there can be a gradual or softer transition between the roughness at the center of the top surface 908 versus the outer limits thereof.

As a user moves a finger or other instrument across the top surface 908, the texture of the surface can affect the friction between the surface and the finger or instrument. Accordingly, the keycap 900 can be configured for the user to feel less friction at the edge areas 914, 916, 918, 920 and more friction at the central area 930. Thus, the middle of the top surface 908 can be configured to feel stickier, tackier, or to provide more sliding resistance to the finger or other instrument and thereby help the user find and stay in contact with the keycap 900 closer to the middle of the top surface 908. The texture properties of keycap 900 can be applied to other embodiments herein. For example, keycap 200 can have outer edge areas with different texture as compared to the center of the top surface 208 thereof.

In other embodiments, the outer edge areas 914, 916, 918, 920 can be configured to provide more friction than the central area 930 or middle of the top surface 908. In this case, the friction increases as the user who engages the middle of the top surface 908 moves toward the outer edges. Accordingly, the user can be less likely to slide his or her finger or other instrument off of the edge of the keycap 900 after first engaging it more centrally.

The different textures of the top surface 908 can also affect light dispersion and reflection at the transparent body 902. For example, a smoother central area 930 can correspond to less diffusion of light in comparison to rougher outer edge areas 914, 916, 918, 920. Thus, the outer edge areas 914, 916, 918, 920 can appear brighter than the central area 930 from some viewing angles. In some embodiments, the side surfaces 932, 934 (see FIG. 9) of the transparent body 902 can be satin, frosted, or otherwise textured to further enhance their light-diffusing properties around the perimeter of the keycap 900. See also side surface 1009 of FIG. 10, which has a grainy texture. The side surfaces 932, 934 can alternatively be glossy or smooth and reflective.

Figure 10:
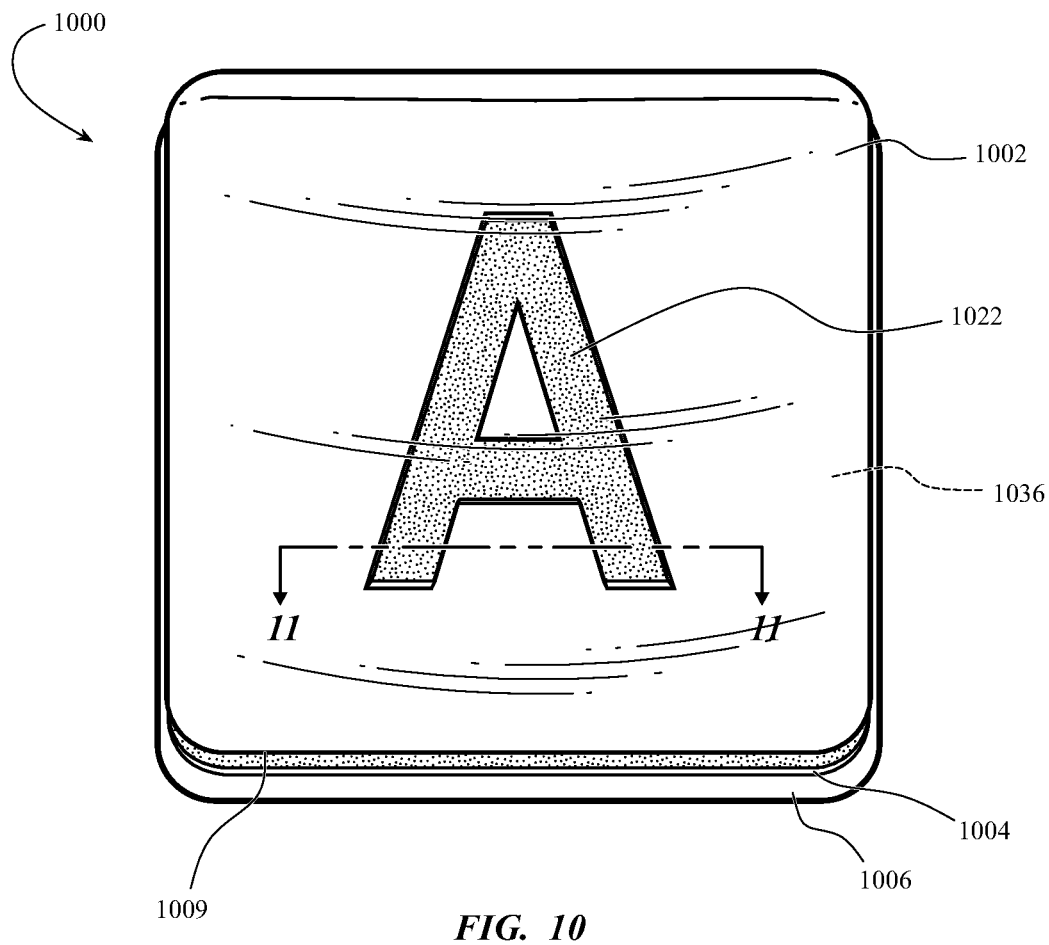
FIG. 10 shows an isometric view of a keycap according to another embodiment of the present disclosure.
Figure 11:
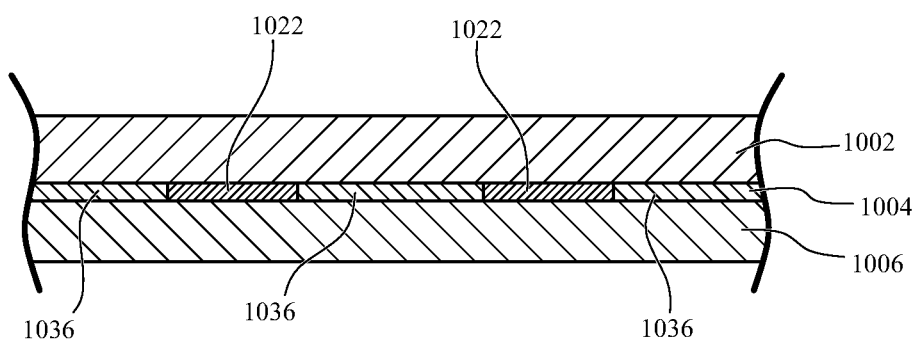
FIG. 11 shows a section view of the keycap of FIG. 10 taken through section lines 11-11 in FIG. 10.

FIG. 10 is an isometric view of another keycap 1000 that is similar to keycap 200 with a transparent body 1002, middle layer 1004, and carrier body 1006. FIG. 11 shows a side section view through the keycap 1000 as indicated by section lines 11-11 in FIG. 10. In this case, the glyph 1022 in the middle layer 1004 can comprise a material that is more opaque than the rest of the middle layer 1004, as described above in connection with FIGS. 2-3. Accordingly, the middle layer 1004 can comprise a transparent or translucent material 1036 surrounding a glyph 1022 that more effectively blocks light through the keycap 1000. This configuration can beneficially improve visibility of the glyph 1022 in bright ambient light conditions. Additionally, the keycap 1000 can more dramatically change color if the backlight illumination changes color. For example, dual-color or RGB LEDs used for backlighting can change the color of a larger proportion of the keycap as compared to keycap 200, including the edges and areas surrounding the glyph 1022. The backlighting can change the brightness and color of the entire middle layer 1004 aside from the glyph 1022. In some embodiments, the glyph 1022 can also be at least partially translucent, in which case the backlighting can change the brightness and color of the entire middle layer 1004.

In some embodiments, translucent material 1036 can be part of the carrier body 1006. For example, the material of the carrier body 1006 can be overmolded around material for the glyph 1022 that has been applied to the bottom of the transparent body 1002. Thus, the carrier body 1006 can be visible through the transparent body 1002. The carrier body 1006 can also be used as a diffuser for light transferred through the locations of the translucent material 1036 indicated in FIGS. 10 and 11. The carrier body 1006 of keycap 1000 can otherwise comprise features described above in connection with carrier body 206 of keycap 200.

Figure 12:
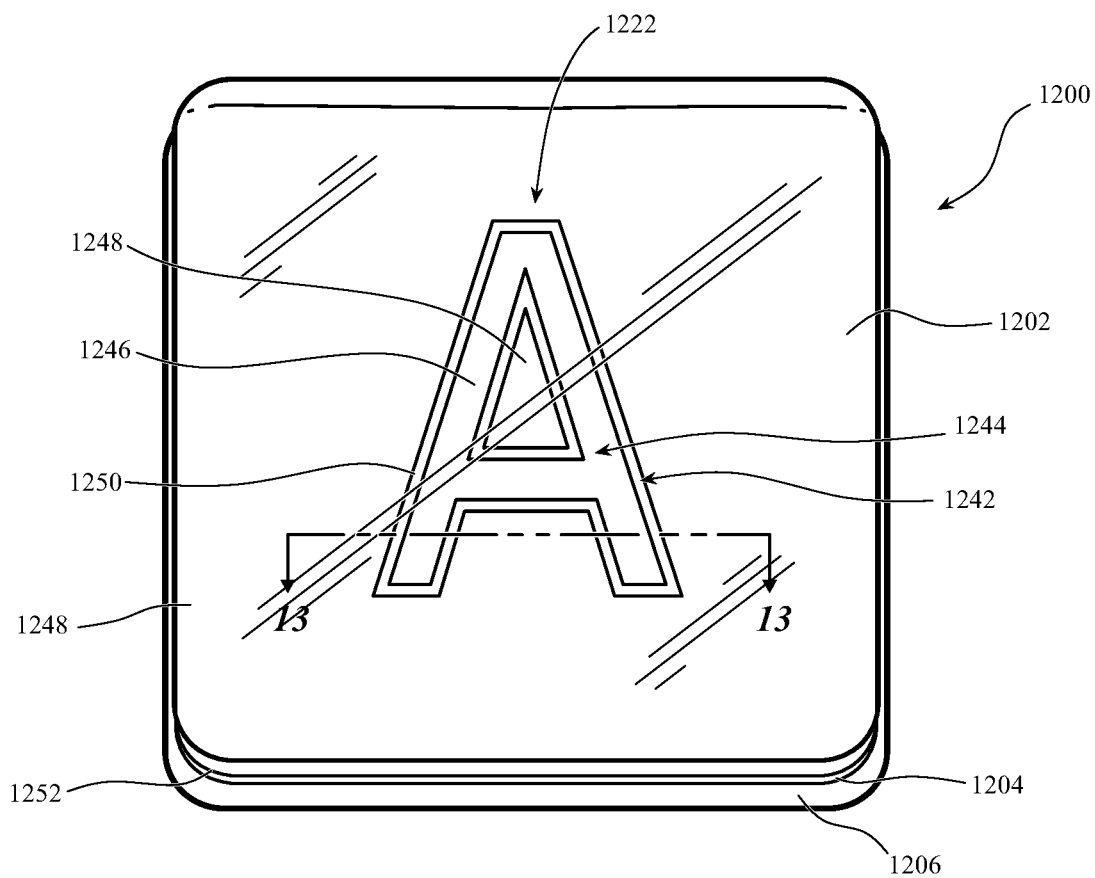
FIG. 12 shows an isometric view of a keycap according to another embodiment of the present disclosure.
Figure 13:
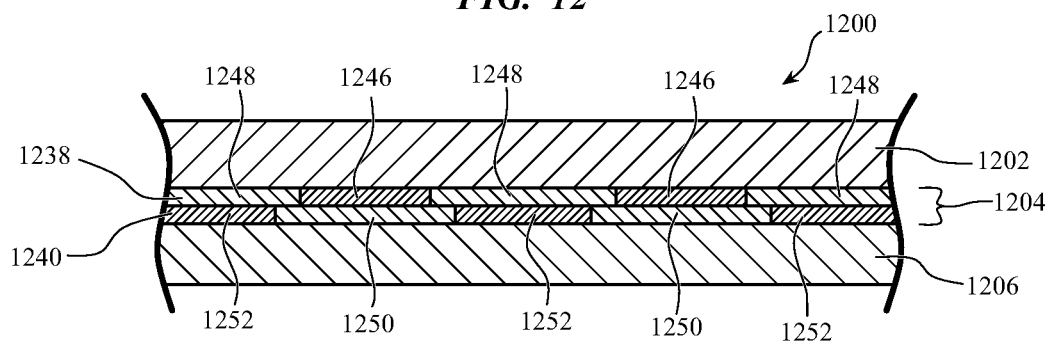
FIG. 13 shows a section view of the keycap of FIG. 12 taken through section lines 13-13 in FIG. 12.

FIG. 12 illustrates an isometric view of another embodiment of a keycap 1200 similar to keycap 200. FIG. 13 shows a side section view of the keycap 1200 taken through section lines 13-13 in FIG. 12. The glyph 1222 of this embodiment can be formed in a two-part middle layer 1204 below a transparent body 1202. A carrier body 1206 can be provided below the middle layer 1204. The transparent body 1202 and carrier body 1206 of keycap 1200 can comprise features described above in connection with other transparent bodies and carrier bodies described herein.

The middle layer 1204 can comprise at least two component layers or laminated sections, such as an upper layer 1238 and a lower layer 1240. The upper layer 1238 can be positioned adjacent to and contacting the transparent body 1202, and the lower layer 1240 can be positioned adjacent to and contacting the carrier body 1206. The lower layer 1240 can define the outermost perimeter and outer area 1242 of the glyph 1222, and the upper layer 1238 can define an inner area 1244 of the glyph 1222 that is laterally surrounded by the outer area 1242. In some embodiments, the upper and lower layers 1238, 1240 can each be about 10 microns in thickness.

The upper layer 1238 can comprise a first section 1246 and a second section 1248, and the lower layer 1240 can comprise a third section 1250 and a fourth section 1252. See FIG. 13. The interface between the first section 1246 and the second section 1248 can define the boundaries of the inner area 1244, and the interface between the third section 1250 and the fourth section 1252 can define the boundaries of the outer area 1242.

Each of the sections 1246, 1248, 1250, 1252 can comprise a different material or a material having different visual characteristics or appearance. For example, the sections 1246, 1248, 1250, 1252 can comprise reflective or partially mirrored reflective coatings, material inserts, or inks. As used herein, a "mirrored" or "partially mirrored" reflective material or coating is configured to reflect substantially a portion or set of wavelengths of visible light from its surface, similar to a mirror. Thus, a mirrored or partially mirrored material of the present disclosure can be configured to reflect about 1-10 percent of light (without reflecting the remaining 90-99 percent), about 10-20 percent of light, about 20-30 percent of light, about 30-40 percent of light, etc. up to about 90-100 percent of light (e.g., a perfect mirror). Additionally, the mirrored or partially mirrored material can be configured to reflect certain colors or can be configured with a color-tinted appearance. In some embodiments, mirrored or partial mirror coatings (e.g., PVD) can have a thickness of about 20 nanometers. The mirror or partial mirror coatings can be applied to a top surface, a bottom surface, or both top and bottom surfaces of the layers 1238, 1240.

In some embodiments, the partially mirrored material can comprise an angle filter or light-polarizing characteristics such as those discussed in connection with the embodiment of FIG. 15 herein. For example, an angle filter or polarizing material can be attached to a surface of the partially mirrored material or can be integrated into the body of the partially mirrored material.

In various embodiments, the first section 1246 can be more reflective than the second, third, or fourth sections 1248, 1250, 1252. For example, the first section 1246 can be more reflective than the second section 1248. In one embodiment, the first section 1246 can comprise a material that is 50 percent reflective and 50 percent transmissive, such as, for example, an aluminum physical vapor deposition (PVD) coating or other PVD coating with those reflective properties. The second section 1248 can comprise a material that is less reflective such as, for example, a 10 percent reflective and 90 percent transmissive material (e.g., another PVD coating having those reflective properties). Thus, the first section 1246 can transmit less light than the second section 1248. The second section 1248 can appear clearer than the first section 1246.

The third section 1250 and fourth section 1252 can comprise opaque or translucent materials such as, for example, inks or paints. In one embodiment, a third section 1250 can include a translucent white material and a fourth section 1252 including an opaque black material. Accordingly, the third section 1250 can be more light-transmissive than the fourth section 1252. Thus, backlighting of the middle layer 1204 can be more visible through the outer area 1242 than through the fourth section 1252.

Ambient light can be more collectively reflected from the first section 1246 and third section 1250 relative to the second section 1248 and fourth section 1252. Incorporation of partially mirrored reflective coatings can allow backlight illumination to pass through the middle layer 1204 while also reflecting ambient light directed downward onto the keycap 1200. The reduced size of the inner area 1244 relative to the outer area 1242 can produce a "halo" effect around the edge of the glyph 1222, wherein the outer area 1242 can appear brighter than the inner area 1244 when the glyph 1222 is backlit. The reflectivity of the inner area 1244/first section 1248 can allow that area to appear brighter under normal top-down ambient lighting conditions than the outer area 1242/third section 1250. The materials and reflectivity can be selected by the device maker in order to optimize the color, contrast, mirror effect, and size and shape of the outer and inner areas 1242, 1244. The outer area 1242 can appear to have the combined reflective and color properties of the second and third sections 1248, 1250, and the inner area can appear to have the combined reflective and color properties of the first and third sections 1246, 1250. The remainder of the middle layer 1204 can have the combined reflective and color properties of the second and fourth sections 1248, 1252. In some embodiments, the upper layer 1238 can provide reflectivity properties while being otherwise substantially transparent, and the lower layer 1240 can provide color properties while being otherwise substantially matte (i.e., non-reflective).

Figure 14:
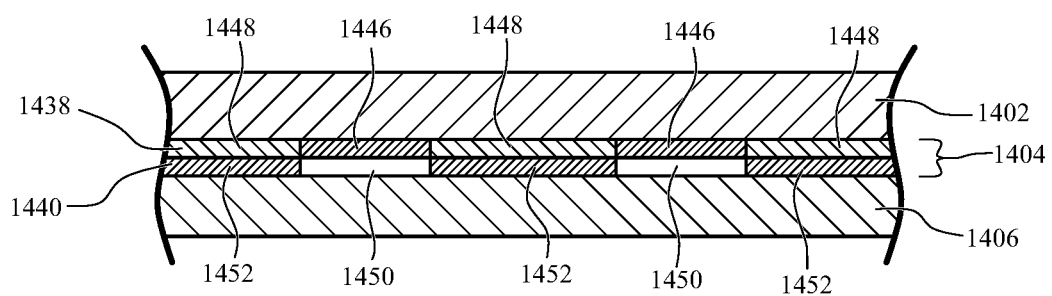
FIG. 14 shows a section view of an alternate embodiment of the keycap of FIG. 12.

In another example embodiment shown in FIG. 14, a first section 1446 substantially overlaps and has the same outer width dimensions as a third section 1450. In this case, light passing upward through the third section 1450 can substantially entirely pass into the first section 1446, and light passing downward through the second section 1448 can substantially entirely pass into the fourth section 1452. Accordingly, substantially the entire area of the glyph can have the collective reflective and color properties of the first and third sections 1446, 1450. The remainder of the keycap can have the collective reflective and color properties of the second and fourth sections 1448, 1452. In some cases, the upper layer 1438 can provide reflectivity properties while being otherwise substantially transparent, and the lower layer 1440 can provide color properties while being otherwise substantially non-reflective.

Figure 15:
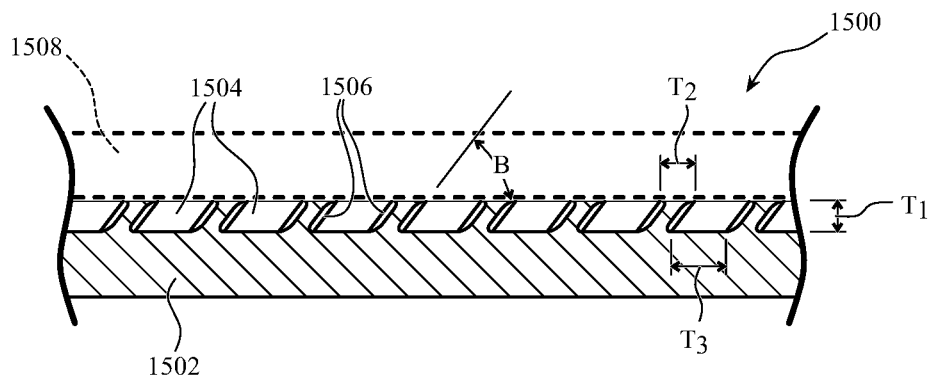
FIG. 15 shows a section view of another embodiment of a keycap according to another embodiment of the present disclosure.

FIG. 15 shows another side section view of an embodiment of a keycap 1500. In this case, the keycap 1500 can have a base layer 1502 that is at least partially transparent. One side of the base layer 1502 (e.g., the top side in FIG. 15) can have a set of spaced-apart grooves or slits 1504 that have sidewalls 1506 covered with opaque material. The slits 1504 can have their sidewalls 1506 oriented at an angle B relative to a horizontal. The angle B can be configured to have any size between about zero degrees and about 180 degrees, and can beneficially have a size between about 40 degrees and about 60 degrees.

The opaque sidewalls 1506 can limit light from exiting the base layer 1502 to a range of angles that coincide with the size, orientation, and location of the sidewalls 1506. The aspect ratio of the depth or thickness $T_1$ of the slits 1504 relative to the width or lateral thicknesses $T_2$ and $T_3$ can control how much light exits the top of the base layer 1502 at various angles relative to the horizontal plane. Thus, the keycap 1500 can comprise an angle filter or other polarizing filter configured to reduce visibility of light within a predetermined range of viewing angles. For example, if the slits 1504 are oriented at an angle of 45 degrees (i.e., wherein B is 45 degrees), the thicknesses $T_1$, $T_2$, $T_3$ can be optimized to prevent light from being visible above a viewing angle of about 60-80 degrees (e.g., at about 70 degrees from the horizontal) or at less than about 10-30 degrees from the horizontal (e.g., at about 20 degrees from the horizontal). A greater thickness $T_1$ narrows the range of viewing angles through the slits 1504, and a greater thickness $T_2$ or $T_3$ increases the range of viewing angles.

In this manner, the keycap 1500 can be configured to have a first appearance to a user positioned at a first viewing position (e.g., a typing position) relative to the keycap 1500 (e.g., between about 40 to 50 degrees from the horizontal), and the keycap 1500 can have a second appearance to a person at a second viewing position (e.g., standing up near the typist). From the first viewing position, a user can observe illumination of glyphs, symbols, or other information through the keycap 1500, and from the second viewing position, the glyphs, symbols, or other information can be obscured or filtered out by the sidewalls 1506. Accordingly, the keyboard can be less disturbing or distracting to a nearby observer by limiting light visible in their direction while still remaining fully illuminated and visible to the typist. The keyboard can also be configured to appear blank to a person outside a predetermined range of viewing angles of the keyboard, which can contribute to a sleek and clean look of the electronic device.

Furthermore, although a single layer of slits 1504 is shown in FIG. 15, wherein each slit intersects the page, a second layer of slits can be positioned perpendicular to those slits that is configured to filter light emitted in side-to-side angles (e.g., into and out of the page for FIG. 15). Thus, the second layer can have a range of viewing angles wherein a person positioned substantially centered in front of and facing the keyboard can observe a first appearance (e.g., a lighted appearance) that is different (e.g., brighter) than what is visible to a person off-center or standing laterally to the side of the keyboard. Accordingly, a keycap can include a dual-directional, dual-layer polarizer or filter.

In some embodiments, the slits 1504 are formed in the top surface of a keycap 1500 such as in a top surface of a transparent body (e.g., 202). The slits 1504 can alternatively or additionally be formed in a middle layer (e.g., 204) or carrier body (e.g., 206). For example, a transparent body 1508 can cover and protect the slits 1504, as shown in FIG. 15.

Figure 16:
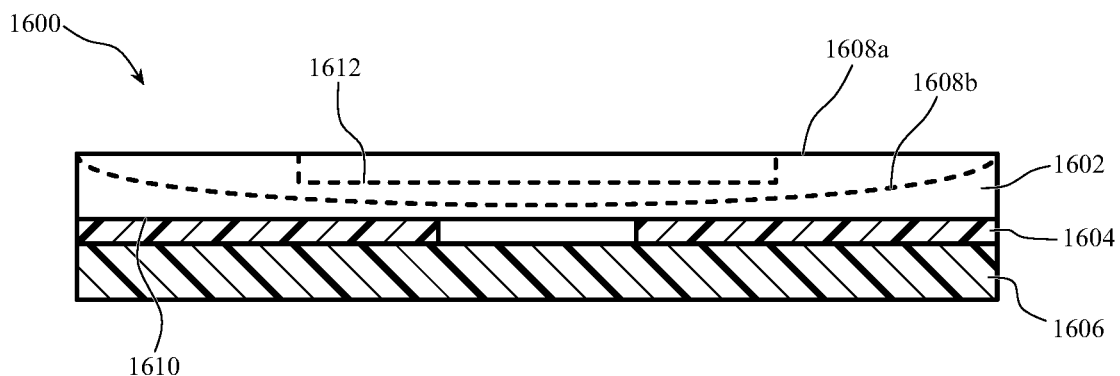
FIG. 16 shows a diagrammatic side section view of a keycap according to another aspect of the present disclosure.

FIGS. 16-20 illustrate various aspects of techniques and structures that can be used to manufacture embodiments of rigid transparent or translucent keycaps. FIG. 16 shows a side section view of a keycap 1600 having a transparent body 1602, a middle layer 1604, and a carrier body 1606 similar to parts described elsewhere herein. The transparent body 1602 can be a block of transparent or translucent material having a generally flat and planar top surface 1608a. The keycap 1600 can be used with the generally flat top surface 1608a.

In some embodiments, the transparent body 1602 can have a curved top surface such as a top surface 1608b indicated by a broken line in FIG. 16. The transparent body 1602 can have a flat top surface 1608a that is modified to produce the curvature of top surface 1608b. The curvature of the top surface 1608b can be cylindrical, spherical, or elliptical across the area of the top of the transparent body 1602, as described elsewhere herein. The transparent body 1602 can be ground, turned, molded, press-formed, chemically modified, modified using a similar process, or combinations thereof.

For example, the transparent body 1602 can be modified by a machining, grinding, or turning process. The grinding or turning process can include application of a cutter or an abrasive material against the flat top surface 1608a to remove material from the transparent body 1602 and produce the curvature of top surface 1608b. For example, a cutting tool or sanding or grinding wheel or belt can remove material from the top surface 1608a to change its shape. A diamond cutting tool can grind, cut, or turn the surface of the material used in the transparent body 1602. In some embodiments, the grinding or turning step can comprise a finishing or polishing step in which the cut surface of the transparent body 1602 is smoothed and cleaned. In some embodiments, the tools can be cylindrical, spherical, or elliptical. For example, in some cases the polishing can include sphere lapping, wherein a curved polishing pad is used on a lapping machine and a bottom plate under the workpiece has substantially the same, if not identical, radius as the curvature of the workpiece. A ring and carrier rotating on the rotating bottom pad can make a uniform curvature surface. Additionally, the texture roughness of the polished surface can be controlled by changing the bottom pad grid size. Similarly, sphere grinding can be implemented wherein a grinding wheel is in a slant setup to grind the material of the transparent body. The wheel can be controlled to stay engaged with the transparent body at its center area in order to avoid leaving areas un-ground. This process can provide a decreased cycle time as compared to sphere lapping.

Figure 17:
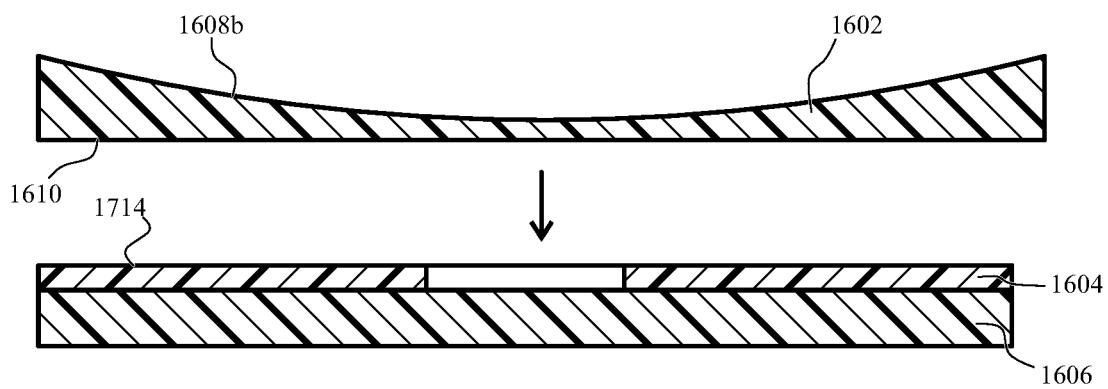
FIG. 17 shows a diagrammatic assembly of a keycap according to another aspect of the present disclosure.

The transparent body 1602 may or may not be attached to the middle layer 1604 and carrier body 1606 while being machined, ground, or turned. Thus, in some cases the transparent body 1602 is attached to the middle layer 1604 or carrier body 1606 after the curvature of the top surface 1068b is formed. FIG. 17 diagrammatically shows how a bottom surface 1610 of the transparent body 1602 can be attached to a top surface 1714 of a middle layer 1604 after the curved top surface 1608b has been formed on the transparent body 1602.

A transparent body 1602 can be pre-formed with a recess or cutout 1612 in the top surface 1608a. In this manner, the transparent body 1602 can be thinned near the center of the top surface 1608a in order to reduce machining time and material costs. A recessed blank transparent body 1602 can be closer in shape to a finished curved top surface 1608b, so less polishing, cutting, grinding, or other removal process is needed to reach the final shape.

In another aspect of the disclosure, the curved top surface 1608b of the transparent body 1602 can be shaped using a molding, gob-forming, or press-forming process. For example, the material of the transparent body 1602 can be put into a liquid or semi-fluid state (e.g., molten glass or a glass gob) and then positioned into (e.g., injected) or pressed against a mold or other forming surface. The material can then cool or harden while in contact with the mold or forming surface and thereafter retain a curved top surface 1608b. In some configurations, press-forming can be performed by heating a sheet or other flat piece of material and then pressing the material against a curved mold or other form surface. For gob forming, the material can be molten, pressed against a curved surface, and then lapped or polished to a final shape. The material can also be injected in a fluid state into a mold (e.g., a two-part injection mold) that at least roughly defines the outer faces of the transparent body 1602. The part can then be removed from a mold and later attached to a middle layer 1604 or carrier body 1606. In some embodiments, the transparent body 1602 can be insert molded within a carrier body 1606. See, e.g., FIG. 7 and its related descriptions herein.

In some embodiments, the transparent body 1602 can be chemically modified, such as by doping a bottom surface 1610 of the transparent body 1602 to induce the curvature of the top surface 1608b. Thus, the transparent body 1602 can be modified from a substantially flat and planar top surface into a curved top surface 1608b by chemical modification of the bottom surface 1610, which remains substantially flat after being modified. For example, the bottom surface can be expanded or contracted via ion exchange, and the top surface can take on curvature as the bottom surface expands or contracts. The bottom surface can thereby be strengthened, and the top surface can gain curvature due to expansion or contraction of the bottom surface.

Figure 18:
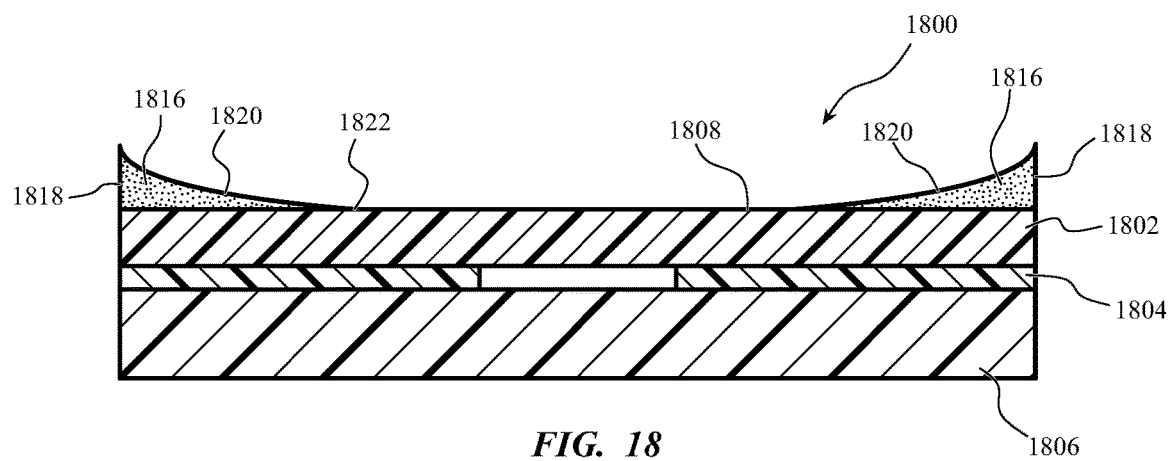
FIG. 18 shows a diagrammatic side section view of another keycap according to the present disclosure.

FIG. 18 shows a diagrammatic side section view of additional aspects of the present disclosure. In the keycap 1800 of FIG. 18, the transparent body 1802 is attached to a middle layer 1804 and carrier body 1806 as in other embodiments disclosed herein. The transparent body 1802 has a generally flat and planar top surface 1808. An additive process can be used to selectively apply material to the top surface 1808 in a manner that adds ridges 1816 to outer portions of the top surface 1808. The ridges 1816 can be formed with outer surfaces 1818 that are aligned with outer surfaces of the transparent body 1802 or other layers in the keycap 1800. The ridges 1816 can also have top surfaces 1820 that are curved.

The curvature of the top surfaces 1820 of the ridges 1816 can gradually transition to the shape of the top surface 1808 of the transparent body 1802 at their inner ends (e.g., at 1822). The curvature of the top surfaces 1820 can be concave, as shown in FIG. 18, can be convex, or a combination thereof. A concave top surface 1820 can guide the user toward the middle of the keycap 1800, and a convex top surface can feel like a ridge or wall on the top surface 1808. Thus, the combined top surfaces 1808, 1820 can form a generally scooped, cylindrical, spherical, or elliptical curvature for the keycap 1800. In some embodiments, the top surface 1808 of the transparent body 1802 can be generally flat with convex top surfaces of the ridges 1816 similar to the profile shapes shown in FIGS. 6-7.

The ridges 1816 can be formed by a curable liquid or powder material applied to the top surface 1808 and built up into the shape of the ridges 1816. For example, a gel material (e.g., a sol-gel) can be applied to the top surface 1808 that is cured with a curved profile shape. In some embodiments, multiple layers of the material are individually applied and cured to build up the shape of the ridges 1816. The material used can beneficially be transparent or translucent. The ridges 181 can also have a surface finish or texture that differs from the top surface 1808, as in connection with FIGS. 8-9 and their related descriptions herein.

Figure 19:
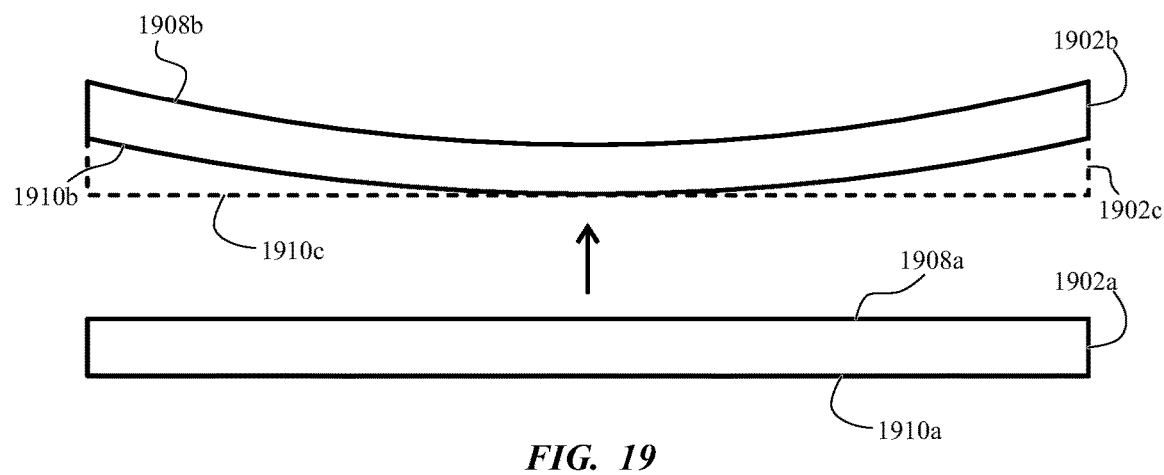
FIG. 19 shows a diagrammatic view of a process of modifying a portion of a keycap according to aspects of the present disclosure.
Figure 20:
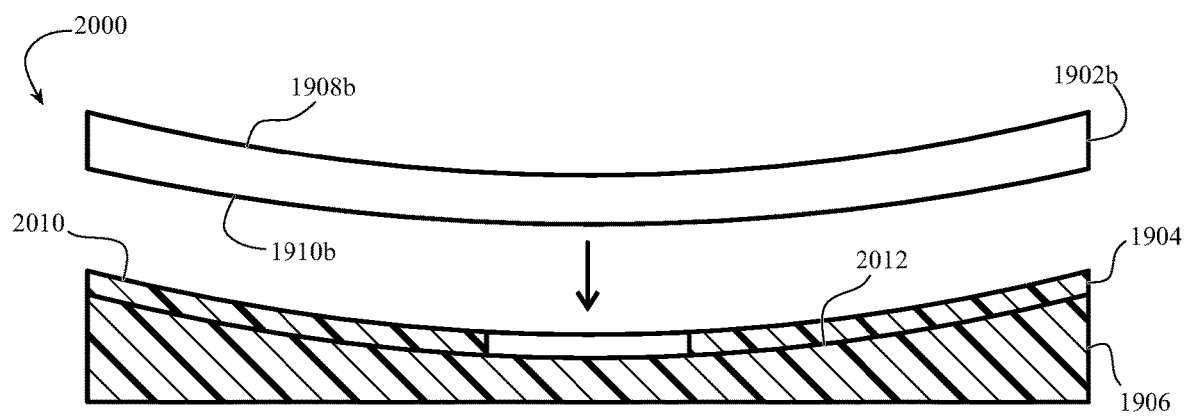
FIG. 20 shows a diagrammatic assembly of a keycap according to another aspect of the present disclosure.

Additional aspects of keycaps of the present disclosure are shown in FIGS. 19-20. FIG. 19 shows a diagrammatic side view of a transparent body 1902a having a flat top surface 1908a and a flat bottom surface 1910a. In some embodiments, curvature can be added to the transparent body 1902a by bending the transparent body into the shape of transparent body 1902b, wherein the transparent body 1902b has a curved top surface 1908b and a curved bottom surface 1910b. The bending can be caused by bending moments applied to the transparent body 1902b (at the ends of the transparent body 1902b). Thus, a bend can be induced in the piece of material used for the transparent body 1902a.

In some arrangements, the curvature of transparent body 1902b can be produced by roll-to-roll forming of a sheet of flat material. For example, a roll of thin glass or similar material can be unrolled, heated (or otherwise softened), and then re-rolled and hardened against form rollers or mold surfaces having the curvature of surfaces 1908b and 1910b. The hardened material can then be cut to shape or otherwise divided into keycap-size shapes having the profile shown in FIG. 19.

The curvature of transparent body 1902b can also be produced using a slumping process. A flat transparent body 1902a can be positioned in a support apparatus, softened, and then moved into contact with a form or mold surface that gives the transparent body the curvature of surfaces 1908b and 1910b. For example, the transparent body 1902a can be positioned on a slumping support, heated to a predetermined flexibility, and then subjected to negative or positive pressure on one or both sides of the transparent body 1902a to cause it to move and to be held against a form surface until hardening into its final curved shape (i.e., 1902b).

Once a curved transparent body 1902b is formed, the curved transparent body 1902b can be attached to a middle layer 1904 or carrier body 1906. See FIG. 20. For example, the bottom surface 1910b of the transparent body 1902 can be attached to a curved top surface 2010 of the middle layer 1904. Alternatively, the middle layer 1904 can be attached to the transparent body 1902b and then the middle layer 1904 can be attached to a curved top surface 2012 of the carrier body 1906. For example, the transparent body 1902b can be attached to the middle layer 1904 (or the transparent body 1902b and middle layer 1904 can be attached to the carrier body 1906) by adhering, bonding, gluing, welding, overmolding, insert molding, or similarly connecting them to each other. Attachment of the curved transparent body 1902b to the middle layer 1904 can limit unbending of the material due to the attachment method constraining the surface 1910b to the curve of the top surfaces 2010, 2012 of the middle layer 1904 or carrier body 1906. The attachment method can hold the surfaces against each other and thereby prevent the transparent body 1902b from elastically returning to its unmodified shape (i.e., 1902a). As a result, the keycap 2000 can have a curved top surface 1908b. This embodiment can also beneficially have curved inner component top surfaces 2010, 2012 below the outer curved top surface 1908b to reduce lens effects or other visual distortion caused by the curvature of the transparent body 1902 or to provide a different visual appearance than other embodiments disclosed herein.

A bent embodiment of the transparent body 1902b can have increased internal stresses while held against the middle layer 1904 or carrier body 1906, and those stresses can be preserved by the attachment of the bottom surface 1910*b* to at least one of the top surfaces 2010, 2012. In some embodiments, the transparent body 1902*b* can have its internal stresses relieved after the bend is induced. For example, the transparent body 1902*b* can be heated and cooled (e.g., annealed) to reduce and relieve internal stresses. The transparent body 1902*b* can thereby be made less susceptible to cracking, chipping, or developing a foggy or otherwise unclear appearance.

Referring again to FIG. 19, in another embodiment, the flat transparent body 1902*a* can be modified to take on a curved top surface 1908*b* and a flat bottom surface 1910*c*, as shown in part by the broken-line profile of transparent body 1902*c*. The shape of transparent body 1902*c* can be formed using a process such as chemical strengthening, molding, gob forming, press forming, machining, grinding, turning, or other processes described elsewhere herein. Thus, the transparent body 1902*c* can have at least a cross-sectional shape profile similar to transparent body 1602 described in connection with FIGS. 16-17.

In various other embodiments, the above-indicated features and processes can be combined or merged in various ways. For example, a keycap can be formed using a transparent body with a top surface curvature similar to top surface 408, ridges similar to edges 514, 516 at edges of the top surface curvature, texture differences similar to areas 914, 916 and 930, an opaque glyph similar to glyph 1022, a partially mirrored reflective material in an area surrounding the glyph (as described in connection with the layers 1238, 1240 of FIG. 13), and angle filters (as described in connection with keycap 1500). It will be understood that many other variations and permutations of these features can also be combined to create keycaps having improved visibility, durability, aesthetic appeal, and key definition for various types of devices.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A keycap for a keyboard, the keycap comprising:
a key body comprising:
   a transparent body having a bottom surface;
   a partially mirrored material positioned under the bottom surface of the transparent body;
   a lower layer positioned under and contacting the partially mirrored material, the lower layer having a first section defining a boundary and a second section within the boundary, the partially mirrored material overlapping the boundary, the first section comprising a first opaque or translucent material, the second section comprising a second opaque or translucent material, the first opaque or translucent material and the second opaque or translucent material each having different color properties; and
   a carrier body configured to support the transparent body and the partially mirrored material.

2. The keycap of claim 1, wherein the partially mirrored material includes a third section defining a glyph boundary and a fourth section surrounding the glyph boundary.

3. A keycap for a keyboard, the keycap comprising:
a key body comprising:
   a transparent body having a bottom surface;
   a partially mirrored material positioned under the bottom surface of the transparent body, the partially mirrored material having a first section defining a first glyph boundary and a second section surrounding the first glyph boundary, the first and second sections having different visual characteristics;
   an opaque layer positioned under and contacting the partially mirrored material, the opaque layer having a third section forming a second glyph boundary and a fourth section surrounding the second glyph boundary, the third and fourth sections having different visual characteristics, the first section of the partially mirrored material overlapping the third section of the opaque layer; and
   a carrier body configured to support the transparent body and the partially mirrored material.

4. The keycap of claim 3, wherein the key body further comprises an opaque material positioned under the bottom surface of the transparent body, the opaque material having a glyph aperture bounded by the second glyph boundary, the partially mirrored material covering the glyph aperture, wherein the carrier body, the partially mirrored material, and the transparent body are configured to pass light from a light source below the carrier body through the carrier body, the partially mirrored material, and the transparent body.

5. The keycap of claim 3, wherein the partially mirrored material is an angle filter.

6. The keycap of claim 3, wherein the transparent body comprises a top surface having edges and a center, the edges being raised relative to the center.

7. The keycap of claim 3, wherein the second glyph boundary defines an outer area of a glyph of the key body and the first glyph boundary defines an inner area of the glyph.

8. The keycap of claim 3, wherein an aperture is formed within the second glyph boundary, the aperture being filled with a translucent material.

9. The keycap of claim 3, wherein a non-mirrored material is positioned in the first section of the partially mirrored material.

* * * * *